(12) United States Patent
Katanoda

(10) Patent No.: US 10,800,274 B2
(45) Date of Patent: Oct. 13, 2020

(54) CHARGING SYSTEM FOR ELECTRICALLY DRIVEN VEHICLES

(71) Applicant: Toyota Jidosha Kabushiki Kaisha, Toyota-shi, Aichi-ken (JP)

(72) Inventor: Tomoya Katanoda, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 500 days.

(21) Appl. No.: 15/723,466

(22) Filed: Oct. 3, 2017

(65) Prior Publication Data

US 2018/0099570 A1 Apr. 12, 2018

(30) Foreign Application Priority Data

Oct. 12, 2016 (JP) .................................. 2016-200675

(51) Int. Cl.
| | |
|---|---|
| B60L 53/14 | (2019.01) |
| B60L 53/65 | (2019.01) |
| B60L 58/12 | (2019.01) |
| B60L 53/64 | (2019.01) |
| B60L 53/66 | (2019.01) |
| B60L 53/63 | (2019.01) |
| B60L 11/18 | (2006.01) |
| G06Q 30/02 | (2012.01) |
| G06Q 50/06 | (2012.01) |

(52) U.S. Cl.
CPC ............ *B60L 53/14* (2019.02); *B60L 11/184* (2013.01); *B60L 53/63* (2019.02); *B60L 53/64* (2019.02); *B60L 53/65* (2019.02); *B60L 53/665* (2019.02); *B60L 58/12* (2019.02); *G06Q 30/0283* (2013.01); *G06Q 50/06* (2013.01); *Y02E 60/00* (2013.01); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 10/126* (2013.01); *Y04S 30/14* (2013.01)

(58) Field of Classification Search
None
See application file for complete search history.

(56) References Cited

U.S. PATENT DOCUMENTS

| | | |
|---|---|---|
| 2010/0217485 A1 | 8/2010 | Ichishi |
| 2010/0262566 A1 | 10/2010 | Yamamoto |
| 2011/0078092 A1 | 3/2011 | Kim et al. |

(Continued)

FOREIGN PATENT DOCUMENTS

| | | |
|---|---|---|
| CN | 101878576 A | 11/2010 |
| CN | 101896930 A | 11/2010 |

(Continued)

*Primary Examiner* — Robert Grant
*Assistant Examiner* — Tynese V McDaniel
(74) *Attorney, Agent, or Firm* — Dinsmore & Shohl LLP

(57) ABSTRACT

A control apparatus of a charging system for electrically driven vehicles sets a first usage condition for a hybrid vehicle when an electrically driven vehicle fusing electricity supply equipment is the hybrid vehicle provided with an internal combustion engine, and set a second usage condition for an electric vehicle different from the first usage condition when an electrically driven vehicle using the electricity supply equipment is the electric vehicle provided with no internal combustion engine.

6 Claims, 9 Drawing Sheets

(56) References Cited

U.S. PATENT DOCUMENTS

| | | | | |
|---|---|---|---|---|
| 2011/0093314 A1* | 4/2011 | Redmann | ............... | B60L 1/02 |
| | | | | 705/13 |
| 2011/0144823 A1 | 6/2011 | Muller et al. | | |
| 2012/0187900 A1* | 7/2012 | Murawaka | ............. | B60L 53/65 |
| | | | | 320/106 |

FOREIGN PATENT DOCUMENTS

| | | | |
|---|---|---|---|
| JP | 2013-042579 A | 2/2013 |
| JP | 2014150715 A | 8/2014 |
| WO | 2009/075313 A1 | 6/2009 |

\* cited by examiner

CHARGING SYSTEM FOR ELECTRICALLY DRIVEN VEHICLES

CROSS-REFERENCE TO RELATED APPLICATIONS

This application claims priority to Japanese Patent Application No. 2016-200675 filed on Oct. 12, 2016, the entire contents of which are incorporated herein by reference.

BACKGROUND

1. Technical Field

The disclosure relates to a charging system for electrically driven vehicles, the charging system that is able to charge an in-vehicle electricity storage device by using electricity outside the vehicle (hereinafter, will be also referred to as "external charging").

2. Description of Related Art

Japanese Unexamined Patent Application Publication No. 2013-42579 (JP 2013-42579 A) discloses a public charging station at which external charging is performed for electrically driven vehicles. At the charging station, when an electrically driven vehicle is connected to electricity supply equipment at the charging station, any of an ordinary reservation (sequential reservation) and a priority reservation for the electrically driven vehicle is received. When the electrically driven vehicle desires the priority reservation, the charging station asks a different vehicle, which has already made the ordinary reservation and is on standby, permission for the interruption of the priority reservation. Then, a charging schedule is determined such that the electrically driven vehicle having desired the priority reservation is charged prior to the different vehicle that has allowed the electrically driven vehicle to interrupt.

SUMMARY

In the future, when electrically driven vehicles that can perform external charging are widely used, it is doubtful whether or not a limited number of public charging stations can cover the charging-needs of all of the electrically driven vehicles. In addition, even if a sufficient number of charging stations are built, practical difficulties are postulated in establishing a large-scale electricity network in which all of the electrically driven vehicles can simultaneously perform external charging. Therefore, looking to the future, there is a need to effectively use a limited number of sets of electricity supply equipment.

As the electrically driven vehicles that can perform external charging, hybrid vehicles and electric vehicles are present. The hybrid vehicle is provided with an internal combustion engine in addition to a motor. The electric vehicle is provided with no internal combustion engine. Even though external charging cannot be performed, the hybrid vehicle can travel or generate electricity by using the internal combustion engine when fuel is supplied to the internal combustion engine. In contrast, since the electric vehicle is provided with no internal combustion engine, when external charging cannot be performed and an electricity storage device storing electricity to be supplied to the motor becomes empty, the electric vehicle cannot travel any longer. In order to achieve effective usage of the electricity supply equipment, it is desired to actively utilize the difference between the features of the hybrid vehicle and the electric vehicle.

However, in the charging station disclosed in JP 2013-42579 A, whether an electrically driven vehicle using the electricity supply equipment is the hybrid vehicle or the electric vehicle is not taken into consideration when the priority sequence of charging is determined. Therefore, it is not possible to effectively use the electricity supply equipment in consideration of the difference between the hybrid vehicle and the electric vehicle.

The disclosure is to effectively use a limited number of sets of electricity supply equipment in consideration of the difference between a hybrid vehicle and an electric vehicle.

An aspect of the disclosure relates to a charging system for electrically driven vehicles. The charging system includes a communication apparatus and a control apparatus. The communication apparatus is configured to communicate with an electrically driven vehicle in which an in-vehicle electricity storage device is able to be charged with electricity supplied from electricity supply equipment outside the vehicle. The control apparatus is configured to use information received by the communication apparatus from the electrically driven vehicle and to set a usage condition for the electrically driven vehicle to use the electricity supply equipment. The control apparatus sets a first usage condition for a hybrid vehicle when an electrically driven vehicle using the electricity supply equipment is the hybrid vehicle provided with an internal combustion engine. The control apparatus sets a second usage condition for an electric vehicle different from the first usage condition when an electrically driven vehicle using the electricity supply equipment is the electric vehicle provided with no internal combustion engine.

With the aspect, the first usage condition for the hybrid vehicle is set as a condition different from the second usage condition for the electric vehicle. For example, when the control apparatus has the first usage condition stricter than the second usage condition so as to actively use the features of the hybrid vehicle being able to travel when fuel is supplied, the electric vehicle is more likely to use the electricity supply equipment than the hybrid vehicle. In addition, for example, in a case where the hybrid vehicle needs to have precedence over the electric vehicle in external charging, when the control apparatus further relaxes the first usage condition than the second usage condition, the hybrid vehicle can be more likely to use the electricity supply equipment than the electric vehicle. As a result, in consideration of the difference between the hybrid vehicle and the electric vehicle, it is possible to effectively use the limited number of sets of electricity supply equipment.

In the aspect, a unit price for charging electricity to be supplied from the electricity supply equipment under the first usage condition may be set to be higher than a unit price for charging electricity under the second usage condition.

Even through the hybrid vehicle cannot use the electricity supply equipment, the hybrid vehicle can travel when fuel is supplied. Therefore, the convenience of a user is not significantly impaired. In contrast, when the electric vehicle cannot use the electricity supply equipment, the electricity storage device is depleted and can become unable to travel. Therefore, the convenience of the user is significantly impaired. Thus, in the configuration, the unit price for charging electricity under the first usage condition for the hybrid vehicle is set to be higher than the unit price for charging electricity under the second usage condition for the electric vehicle. Accordingly, when there is an increase in the opportunity in which a user of the hybrid vehicle shelves the usage of the electricity supply equipment, a user of the electric vehicle is likely to use the electricity supply equipment. As a result, it is possible to effectively use the limited number of sets of electricity supply equipment by actively using the features of the hybrid vehicle being able to travel when fuel is supplied, without impairing the convenience of the user of the electrically driven vehicle.

In the aspect, the first usage condition may include a first sub usage condition and a second sub usage condition different from the first sub usage condition. The control apparatus may set the first sub usage condition when an electrically driven vehicle using the electricity supply equipment is the hybrid vehicle in which the amount of remaining fuel in the internal combustion engine is equal to or greater than a threshold. The control apparatus may set the second sub usage condition when an electrically driven vehicle using the electricity supply equipment is the hybrid vehicle in which the amount of remaining fuel in the internal combustion engine is less than the threshold.

In the aspect, a unit price for charging electricity to be supplied from the electricity supply equipment under the first sub usage condition may be set to be higher than a unit price for charging electricity under the second sub usage condition.

Even when the hybrid vehicle operates the internal combustion engine and travels, if the amount of remaining fuel in the internal combustion engine is small, the internal combustion engine cannot be operated for a long period of time, and there is a possibility that the hybrid vehicle will become unable to travel in an early stage. Therefore, with the aspect, the unit price for charging electricity under the first sub usage condition for the hybrid vehicle having the amount of remaining fuel in the internal combustion engine equal to or greater than the threshold is set to be higher than the second sub usage condition for the hybrid vehicle having the amount of remaining fuel in the internal combustion engine less than the threshold. Accordingly, the user of the hybrid vehicle having a large amount of remaining fuel is more likely to use the electricity supply equipment than the user of the hybrid vehicle having a small amount of remaining fuel.

In the aspect, the first usage condition may have a limited area in which the electricity supply equipment is able to be used, compared to the second usage condition.

With the aspect, the hybrid vehicle has a particularly limited area as the area in which the electricity supply equipment is able to be used (for example, an area away from a place where the user uses the electricity supply equipment). Accordingly, when there is an increase in the opportunity in which the user of the hybrid vehicle shelves the usage of the electricity supply equipment, the user of the electric vehicle is likely to use the electricity supply equipment. As a result, it is possible to effectively use the limited number of sets of electricity supply equipment by actively using the features of the hybrid vehicle being able to travel when fuel is supplied, without impairing the convenience of the user of the electrically driven vehicle.

In the aspect, the electricity supply equipment may include first electricity supply equipment and second electricity supply equipment supplying more electricity than the first electricity supply equipment. The first usage condition may include a condition of prohibiting the second electricity supply equipment from being used.

For example, when there is not enough time before a scheduled departure time, since the hybrid vehicle is provided with the internal combustion engine, the hybrid vehicle has low necessity of ensuring the remaining amount in the electricity storage device within a short time before the scheduled departure time. However, since the electric vehicle is provided with no internal combustion engine, the electric vehicle has high necessity of ensuring the remaining amount in the electricity storage device within a short time before the scheduled departure time. That is, the electric vehicle has high necessity of performing quick charging, compared to the hybrid vehicle. Therefore, in the configuration, the hybrid vehicle is prohibited from using the second electricity supply equipment (for example, direct current electricity supply equipment) supplying more electricity than the first electricity supply equipment (for example, alternating current electricity supply equipment). Accordingly, the electric vehicle having high necessity of performing quick charging can be likely to use the second electricity supply equipment that is able to more quickly charge the electric vehicle than the first electricity supply equipment.

In the aspect, the first usage condition may have a limited time zone in which the electricity supply equipment is able to be used, compared to the second usage condition.

With the aspect, the electric vehicle can have precedence over the hybrid vehicle and can use the time zone in which the hybrid vehicle is limited in using the electricity supply equipment. As a result, it is possible to effectively use the limited number of sets of electricity supply equipment by actively using the features of the hybrid vehicle being able to travel when fuel is supplied, without impairing the convenience of the user of the electrically driven vehicle.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
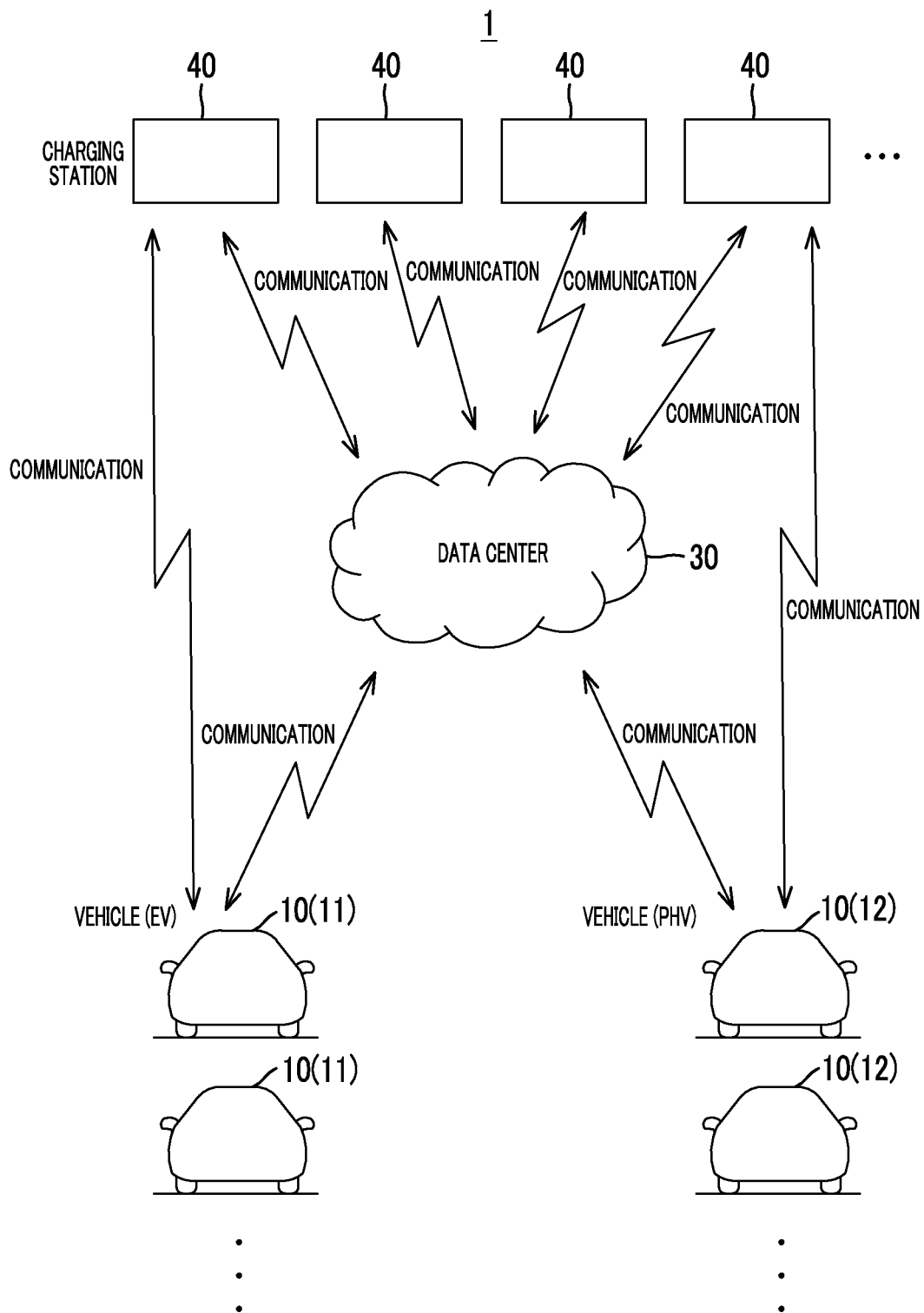
FIG. 1 is a view schematically illustrating an example of an overall configuration of a vehicular electricity supply system.

Hereinafter, embodiments of the disclosure will be described in detail with reference to the drawings. In the drawings, the same reference signs will be applied to the same or corresponding portions, and the descriptions will not be repeated.

Embodiment 1

FIG. 1 is a view schematically illustrating an example of an overall configuration of a charging system 1 according to an embodiment. The charging system 1 includes a plurality of vehicles 10, a data center 30, and a plurality of charging stations 40.

Each of the vehicles 10 is an electrically driven vehicle configured to be able to perform external charging. The vehicles 10 include an electric vehicle (hereinafter, will be also referred to as "EV") 11 and a plug-in hybrid vehicle (hereinafter, will be also referred to as "PHV") 12. The electric vehicle 11 is provided with a motor generator and provided with no engine. The plug-in hybrid vehicle 12 is provided with a motor generator and an engine.

Each of the charging stations 40 is a public facility that is provided with at least one set of electricity supply equipment for performing external charging for the vehicle 10 and can be used by an unspecified large number of users. Each of the charging stations 40 is configured to be able to directly perform radio communication with the vehicles 10 within a range in which communication can be performed.

The data center 30 is configured to be able to perform radio communication with the vehicles 10 and the charging stations 40. The data center 30 can relay communication between the vehicles 10 and the charging stations 40. In addition, the data center 30 can manage a reservation and the like of the charging station 40 (charging place) demand from the vehicle 10.

Figure 2:
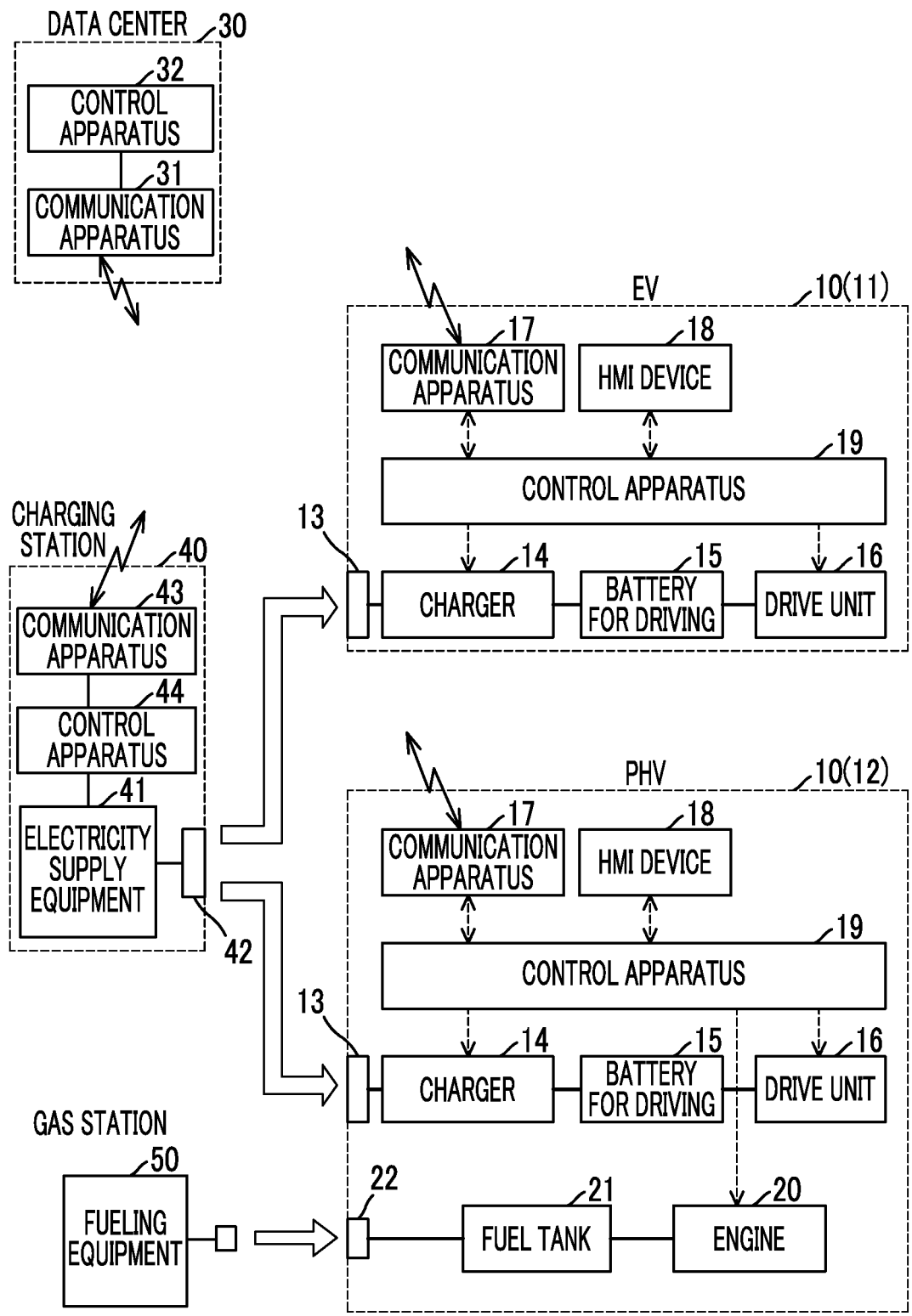
FIG. 2 is a view illustrating an example of a configuration of each of an electric vehicle (EV), a plug-in hybrid vehicle (PHV), a data center, and a charging station.

FIG. 2 is a view illustrating an example of a configuration of each of the EV 11, the PHV 12, the data center 30, and the charging station 40. The data center 30 is provided with a communication apparatus 31 and a control apparatus 32. The charging station 40 is provided with electricity supply equipment 41, a connector 42, a communication apparatus 43, and a control apparatus 44.

The EV 11 includes an inlet 13, a charger 14, a battery 15 for driving, a drive unit 16, a communication apparatus 17, a human machine interface (HMI) device 18, and a control apparatus 19. The inlet 13 is configured to be able to be connected to the connector 42 of the charging station 40.

The charger 14 operates in response to a control signal from the control apparatus 19. The charger 14 performs external charging in which the battery 15 for driving is charged with electricity supplied from the charging station 40. The battery 15 for driving is a rechargeable electricity storage device, for example, a secondary battery such as a nickel-hydrogen battery and a lithium-ion battery.

The drive unit 16 generates vehicle driving force by using electricity supplied from the battery 15 for driving. The drive unit 16 includes the motor generator mechanically connected to driving wheels, and a power control unit (inverter or the like) controlling the energizing amount of the motor generator. An output of the drive unit 16 (energizing amount of the motor generator) is controlled in response to a control signal from the control apparatus 19. The drive unit 16 may include one motor generator, or two or more motor generators.

The communication apparatus 17 is configured to be able to perform radio communication with the communication apparatus 31 of the data center 30. In addition, the communication apparatus 17 is configured to be able to perform radio communication with the communication apparatus 43 of the charging station 40 within the range in which communication can be performed. The communication apparatus 17 is connected to the control apparatus 19 through a communication line. The communication apparatus 17 transmits information transmitted from the control apparatus 19 to the data center 30 or the charging station 40. The communication apparatus 17 transmits information received from the data center 30 or the charging station 40 to the control apparatus 19.

The HMI device 18 is a device that provides the user with various pieces of information for a vehicle driving support or receives an operation of the user. The HMI device 18 includes a display, a speaker, and the like provided inside the vehicle. For example, as the HMI device 18, a display and a speaker of a navigation device (not illustrated) may be applied.

The control apparatus 19 is internally equipped with a CPU and a memory (not illustrated). The control apparatus 19 controls each of instruments in the EV 11 (the charger 14, the drive unit 16, the communication apparatus 17, the HMI device 18, and the like) based on information stored in the memory or information from each of sensors.

The PHV 12 is further provided with an engine 20, a fuel tank 21, and a fuel filler opening 22, in addition to the configuration of the EV 11 (the charger 14, the battery 15 for driving, the drive unit 16, the communication apparatus 17, the HMI device 18, and the control apparatus 19). The fuel filler opening 22 is configured to be able to be connected to fueling equipment 50 at a gas station. The fuel tank 21 stores fuel (gasoline, diesel, or the like) supplied through the fuel filler opening 22. The engine 20 generates power by using the fuel supplied from the fuel tank 21. An output of the engine 20 is controlled in response to a control signal from the control apparatus 19. The purpose of the engine 20 may be to generate electricity, to perform driving, or to generate electricity and to perform driving together.

Basically, the PHV 12 is configured to stop the engine 20 and to perform electric vehicle travelling (EV travelling) using the drive unit 16, until the electricity storing amount of the battery 15 for driving becomes less than a predetermined value. The PHV 12 operates the engine 20 after the electricity storing amount of the battery 15 for driving becomes less than the predetermined value and performs hybrid vehicle travelling (HV travelling) using both the engine 20 and the drive unit 16.

The PHV 12 can perform the HV travelling using the engine 20. In contrast, the EV 11 is provided with no engine 20 and can travel by solely electricity of the battery 15 for driving. Therefore, generally, the full charge capacity of the battery 15 for driving mounted in the PHV 12 is set to have a value smaller than the value of the full charge capacity of the battery 15 for driving mounted in the EV 11.

As described above, the data center 30 is provided with the communication apparatus 31 and the control apparatus 32. The communication apparatus 31 is configured to be able to perform radio communication with the communication apparatus 17 of the vehicle 10 and the communication apparatus 43 of the charging station 40. The communication apparatus 31 is connected to the control apparatus 32 through a communication line. The communication apparatus 31 transmits information transmitted from the control apparatus 32 to the vehicle 10 or the charging station 40. The communication apparatus 31 transmits information received from the vehicle 10 or the charging station 40 to the control apparatus 32.

The control apparatus 32 is internally equipped with a CPU (not illustrated). The control apparatus 32 relays communication between the vehicles 10 and the charging stations 40 based on the information from the communication apparatus 31.

As described above, the charging station 40 is provided with the electricity supply equipment 41, the connector 42, the communication apparatus 43, and the control apparatus 44.

The electricity supply equipment 41 operates in response to a control signal from the control apparatus 44. The electricity supply equipment 41 outputs electricity for external charging to the vehicle 10 connected to the connector 42. The types of the electricity supply equipment 41 include DC electricity supply equipment outputting direct current electricity, and AC electricity supply equipment outputting alternating current electricity.

The communication apparatus 43 is configured to be able to perform radio communication with the communication apparatus 31 of the data center 30. In addition, the communication apparatus 43 is configured to be able to perform radio communication with the communication apparatus 17 of the vehicle 10 within the range in which communication can be performed. The communication apparatus 43 is connected to the control apparatus 44 through a communication line. The communication apparatus 43 transmits information transmitted from the control apparatus 44 to the vehicle 10 or the data center 30. The communication apparatus 43 transmits information received from the vehicle 10 or the data center 30 to the control apparatus 44.

The control apparatus 44 is internally equipped with a CPU (not illustrated). The control apparatus 44 executes predetermined authentication processing with respect to the vehicle 10 and executes external charging based on the information from the communication apparatus 43. The control apparatus 44 manages a reservation of the charging station 40 (reception, change, cancel, and the like). The term "reservation" of the charging station 40 denotes that the date and time of using the electricity supply equipment 41 in the charging station 40 (executing external charging) are designated and a reservation is made.

Setting Usage Condition of Electricity Supply Equipment

In the charging system 1 having the configuration described above, as the vehicle 10 using the electricity supply equipment 41 of the charging station 40, as described above, the PHV 12 provided with the engine 20, and the EV 11 provided with no engine 20 are present. The circumstances of "using" the electricity supply equipment 41 include at least one of actually using the electricity supply equipment 41 (performing external charging) and making a reservation for using the electricity supply equipment 41.

Even though the battery 15 for driving is depleted, the battery storing electricity for driving the drive unit 16 (motor generator), the PHV 12 can perform the HV travelling using the engine 20. In contrast, since the EV 11 is not provided with no engine 20, when the battery 15 for driving is depleted, the EV 11 cannot travel. Therefore, compared to the PHV 12, it is postulated that the EV 11 has great urgency in external charging.

Moreover, even when the PHV 12 operates the engine 20 and performs the HV travelling, if the amount of remaining fuel in the engine 20 is small, the HV travelling cannot continue for a long period of time, and there is a possibility that the PHV 12 will become unable to travel in an early stage. Therefore, compared to the PHV 12 having a large amount of remaining fuel in the engine 20, it is postulated that the PHV 12 having a small amount of remaining fuel in the engine 20 has great urgency in external charging.

Therefore, in the control apparatus 44 of the charging station 40 according to the embodiment, in accordance with whether the vehicle 10 demanding for using the electricity supply equipment 41 (hereinafter, will be also referred to as "usage demand vehicle") is the PHV 12 or the EV 11, the condition for the usage demand vehicle to use the electricity supply equipment 41 (hereinafter, will be also referred to as "usage condition") is changed. Specifically, the control apparatus 44 of the charging station 40 has a usage condition for the PHV 12 (first usage condition for a PHV) stricter than a usage condition for the EV 11 (second usage condition for an EV). Accordingly, it is possible to expect that there is an increase in the opportunity in which a user of the PHV 12 shelves the usage of the electricity supply equipment 41. Therefore, it is possible to make a situation in which the EV 11 is likely to use the electricity supply equipment 41. As a result, it is possible to effectively use the finite electricity supply equipment 41 by actively utilizing the features of the PHV 12 being able to travel when fuel is supplied, without impairing the convenience of the user of the vehicle 10.

Moreover, in the control apparatus 44 of the charging station 40 according to the embodiment, when the usage demand vehicle is the PHV 12, the usage condition for the PHV 12 having a large amount of remaining fuel in the engine 20 becomes stricter than the usage condition for the PHV 12 having a small amount of remaining fuel in the engine 20. Accordingly, compared to the PHV 12 having a large amount of remaining fuel and having low urgency in external charging, the PHV 12 having a small amount of remaining fuel and having greater urgency in external charging can make a situation in which the electricity supply equipment 41 is likely to be used.

Hereinafter, for the convenience of description, the usage condition will be also referred to as "charging hurdle". Processing for setting the usage condition will be also referred to as "charging hurdle setting processing". The circumstances of raising the charging hurdle denote that the usage condition becomes strict. It is possible to consider various techniques as a specific technique of raising the charging hurdle. In the embodiment, descriptions will be given regarding an example in which the charging hurdle is raised by raising a charging fee.

Figure 3:
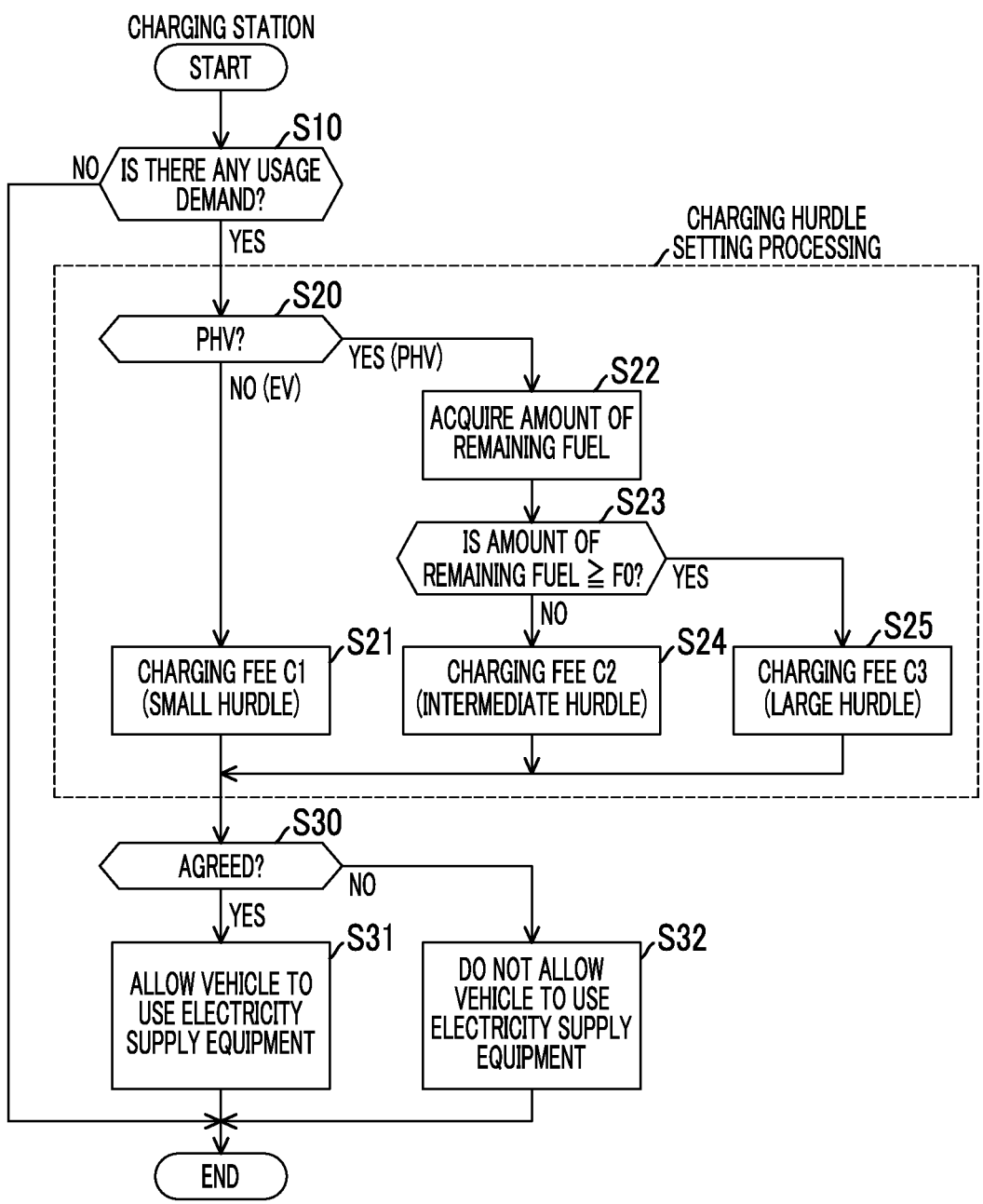
FIG. 3 is a flowchart illustrating an example (first example) of a processing procedure of an control apparatus.

FIG. 3 is a flowchart illustrating an example of a procedure of the charging hurdle setting processing performed by the control apparatus 44 of the charging station 40, according to the embodiment.

In Step (hereinafter, Step will be abbreviated to "S") 10, the control apparatus 44 determines whether or not there is a demand of the vehicle 10 for using the electricity supply equipment 41. For example, when a user of the vehicle 10 performs an operation of demanding for using the electricity supply equipment 41 with respect to the electricity supply equipment 41, or when a signal of demanding for using the electricity supply equipment 41 is received from the vehicle 10, the control apparatus 44 determines that there is a demand of the vehicle 10 for using the electricity supply equipment 41. When there is no demand for using the electricity supply equipment 41 (NO in S10), the control apparatus 44 skips the processing thereafter and the processing ends.

When there is a demand for using the electricity supply equipment 41 (YES in S10), the control apparatus 44 executes the charging hurdle setting processing (processing from S20 to S25).

Specifically, the control apparatus 44 performs communication with the usage demand vehicle and receives information indicating the type of the usage demand vehicle (whether the vehicle is the PHV 12 or the EV 11) from the usage demand vehicle. Then, the control apparatus 44 determines, based on the received information, whether or not the usage demand vehicle is the PHV 12 (S20).

When the usage demand vehicle is the EV 11 (NO in S20), the control apparatus 44 sets the charging fee (unit price for charging electricity per unit time) to have a predetermined value C1. Then, the control apparatus 44 asks the user of the usage demand vehicle whether or not to agree with using the electricity supply equipment 41 at the set charging fee C1 (S21). For example, the unit of the charging fee is "Yen/ (kw×min)".

When the usage demand vehicle is the PHV 12 (YES in S20), the control apparatus 44 acquires information indicating the amount of remaining fuel in the engine 20 of the usage demand vehicle from the usage demand vehicle (S22). Then, the control apparatus 44 determines whether or not the acquired amount of remaining fuel is equal to or greater than a threshold F0 (S23).

When the amount of remaining fuel is less than the threshold F0 (NO in S23), the control apparatus 44 sets the charging fee to have a predetermined value C2 higher than the predetermined value C1. Then, the control apparatus 44 asks the user of the usage demand vehicle whether or not to agree with using the electricity supply equipment 41 at the set charging fee C2 (S24).

When the amount of remaining fuel is equal to or greater than the threshold F0 (YES in S23), the control apparatus 44 sets the charging fee to have a predetermined value C3 further higher than the predetermined value C2. Then, the control apparatus 44 asks the user of the usage demand vehicle whether or not to agree with using the electricity supply equipment 41 at the set charging fee C3 (S25).

Figure 4:
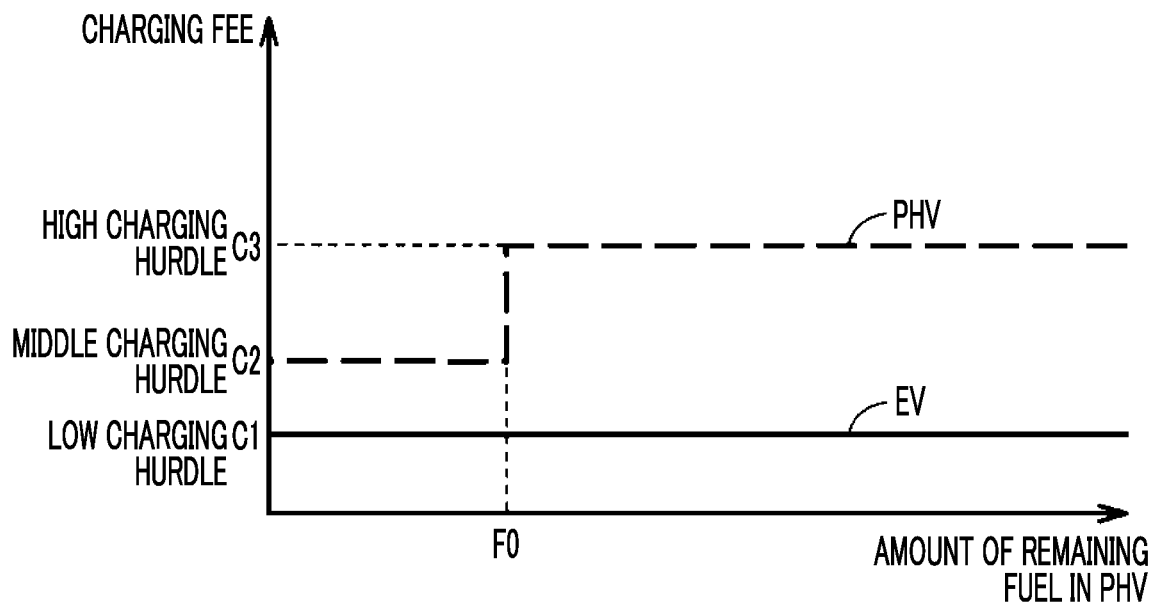
FIG. 4 is a view illustrating an example (first example) of a charging fee (usage condition)

FIG. 4 is a view illustrating an example of the charging fee set through the charging hurdle setting processing (processing from S20 to S25), according to the embodiment. In FIG. 4, the horizontal axis indicates the amount of remaining fuel of the PHV 12, and the vertical axis indicates the charging fee. The solid line indicates the charging fee for the EV 11. The dotted line indicates the charging fee for the PHV 12. Since the EV 11 does not have the engine 20, the charging fee for the EV 11 (solid line) is set regardless of the amount of remaining fuel indicated by the horizontal axis.

As illustrated in FIG. 4, in the embodiment, through the charging hurdle setting processing, the charging fees C2, C3 for the PHV 12 (dotted line) are further raised than the charging fee C1 (solid line) for the EV 11. Accordingly, the charging hurdle for the PHV 12 (first usage condition) becomes higher (stricter) than the charging hurdle for the EV 11 (second usage condition).

Moreover, the charging fee C3 for the PHV 12 having the amount of remaining fuel equal to or greater than the threshold F0 is further raised than the charging fee C2 for the PHV 12 having the amount of remaining fuel less than the threshold F0. Accordingly, the charging hurdle for the PHV 12 (first sub usage condition) having the amount of remaining fuel equal to or greater than the threshold F0 becomes higher (stricter) than the charging hurdle for the PHV 12 (second sub usage condition) having the amount of remaining fuel less than the threshold F0.

Returning to FIG. 3, the control apparatus 44 determines whether or not the user of the usage demand vehicle agrees with using the electricity supply equipment 41 at the charging fee set through the charging hurdle setting processing (S30). When the user agrees with using the electricity supply equipment 41 at the set charging fee (YES in S30), the control apparatus 44 allows the usage demand vehicle to use the electricity supply equipment 41 (S31). Specifically, in accordance with a demand from the user for using the electricity supply equipment 41, the control apparatus 44 executes external charging or receives a reservation of the charging station 40. As described above, the term "reservation" of the charging station 40 denotes that the date and time of using the electricity supply equipment 41 in the charging station 40 are designated and a reservation of using the designated electricity supply equipment 41 on the designated date and time is made.

When the user does not agree with using the electricity supply equipment 41 at the set charging fee (NO in S30), the control apparatus 44 does not allow the usage demand vehicle to use the electricity supply equipment 41 (S32). Specifically, the control apparatus 44 notifies the user of that the usage demand vehicle is not allowed to use the electricity supply equipment 41. Then, the control apparatus 44 does not execute external charging demanded by the user or does not make a reservation of the charging station 40.

As described above, the control apparatus 44 of the charging station 40 according to the embodiment has the usage condition for the PHV 12 stricter than the usage condition for the EV 11. Accordingly, it is possible to expect that there is an increase in the opportunity in which the user of the PHV 12 shelves the usage of the electricity supply equipment 41. Therefore, it is possible to make a situation in which the EV 11 is likely to use the electricity supply equipment 41. As a result, it is possible to effectively use the finite electricity supply equipment 41 by actively utilizing the features of the PHV 12 being able to travel when fuel is supplied, without impairing the convenience of the user of the vehicle 10.

Moreover, in the control apparatus 44 of the charging station 40 according to the embodiment, the usage condition for the PHV 12 having the amount of remaining fuel equal to or greater than the threshold F0 becomes stricter than the usage condition for the PHV 12 having the amount of remaining fuel less than the threshold F0. Accordingly, compared to the PHV 12 having a large amount of remaining fuel and having low urgency in external charging, the PHV 12 having a small amount of remaining fuel and having great urgency in external charging can be likely to use the electricity supply equipment 41.

Modification Example 1

In the charging hurdle setting processing according to Embodiment 1, the usage condition (charging fee) is set based on parameters such as the type of the usage demand vehicle (whether the vehicle is the PHV 12 or the EV 11) and the amount of remaining fuel of the PHV 12.

However, the parameter used in setting the usage condition is not limited to the above-described parameters. For example, the usage condition may be set based on parameters such as the type of the usage demand vehicle, a SOC indicating the state of charge of the battery 15 for driving, and the type of the electricity supply equipment 41 (whether the electricity supply equipment is the DC electricity supply equipment or the AC electricity supply equipment).

Figure 5:
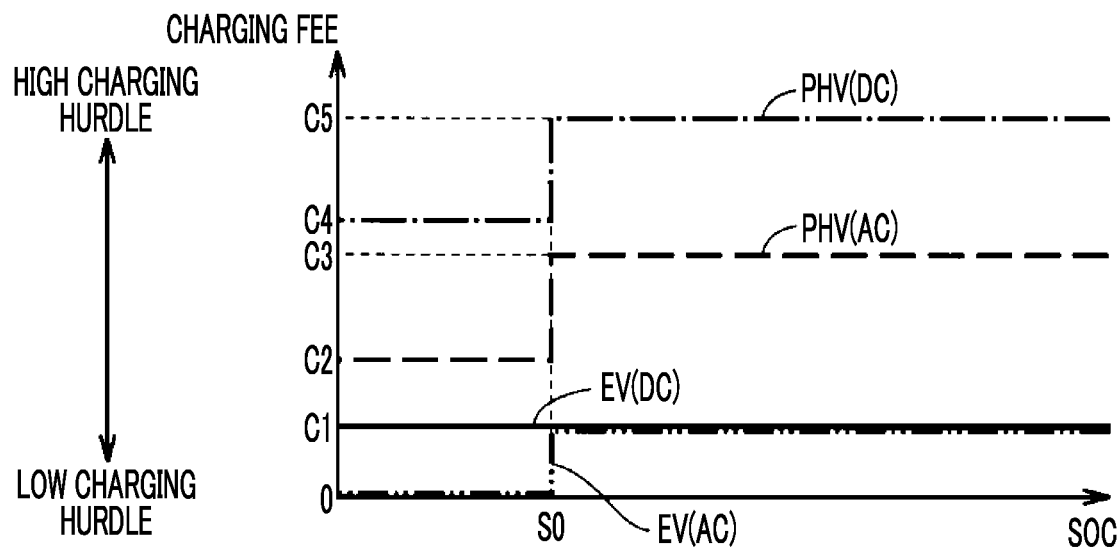
FIG. 5 is a view illustrating a different example (second example) of the charging fee (usage condition)

FIG. 5 is a view illustrating a different example of the charging fee set through the charging hurdle setting processing according to Modification Example 1. In FIG. 5, the horizontal axis indicates the SOC of the battery 15 for driving, and the vertical axis indicates the charging fee. The solid line indicates the usage condition (charging fee) of the DC electricity supply equipment for the EV 11. The dotted line indicates the usage condition (charging fee) of the AC electricity supply equipment for the PHV 12. The one-dot chain line indicates the usage condition (charging fee) of the DC electricity supply equipment for the PHV 12. The two-dot chain line indicates the usage condition (charging fee) of the AC electricity supply equipment for the EV 11.

As illustrated in FIG. 5, in Modification Example 1, similar to Embodiment 1, charging fees C2 to C5 for the PHV 12 (dotted line, one-dot chain line) are further raised than the charging fee C1, and 0 for the EV 11 (solid line, two-dot chain line).

Moreover, even in a case of the same PHV 12, the charging fees C4, C5 (one-dot chain line) of when the PHV 12 uses the DC electricity supply equipment are further raised than the charging fees C2, C3 (dotted line) of when the PHV 12 uses the AC electricity supply equipment. Generally, it is often possible to quickly charge the electric vehicle when external charging is performed by using the DC electricity supply equipment, compared to when external charging is performed by using the AC electricity supply equipment. Therefore, in Modification Example 1, even in a case of the same PHV 12, the usage condition of when the PHV 12 uses the DC electricity supply equipment becomes stricter than the usage condition of when the PHV 12 uses the AC electricity supply equipment. Accordingly, the opportunity for the PHV 12 to use the DC electricity supply equipment can be reduced. As a result, the EV 11 having great urgency in external charging is likely to use the DC electricity supply equipment that can quickly charge the vehicle.

Moreover, in a case where the PHV 12 uses the AC electricity supply equipment (dotted line), the charging fee C3 of when the SOC is equal to or greater than a threshold S0 is further raised than the charging fee C2 of when the SOC is less than the threshold S0. Similarly, in a case where the PHV 12 uses the DC electricity supply equipment (one-dot chain line), the charging fee C5 of when the SOC is equal to or greater than the threshold S0 is further raised than the charging fee C4 of when the SOC is less than the threshold S0. Accordingly, the PHV 12 having a small SOC is likely to use the electricity supply equipment 41.

In Modification Example 1, the charging fee of when the EV 11 having an SOC less than the threshold S0 uses the AC electricity supply equipment is set to "zero". Accordingly, the user of the EV 11 having a small SOC can perform external charging by using the AC electricity supply equipment even though the user of the EV 11 does not have cash, a credit card, or the like at hand. Therefore, a dead stop of the EV 11 on the road caused due to the depleted battery 15 for driving can be reduced.

Modification Example 2

In Embodiment 1, descriptions are given regarding an example in which the control apparatus 44 of the charging station 40 executes the entire processing illustrated in the flowchart in FIG. 3. However, all or a part of the processing illustrated in the flowchart in FIG. 3 may be executed by the control apparatus 32 of the data center 30 while the control apparatus 32 of the data center 30 communicates with the charging station 40 and the vehicle 10.

Modification Example 3

In the charging hurdle setting processing according to Embodiment 1, the usage condition is set based on the parameters of both the type of the usage demand vehicle and the amount of remaining fuel of the PHV 12. However, the usage condition may be set based on solely the parameter of the type of the usage demand vehicle, not including the amount of remaining fuel of the PHV 12 as the parameter.

Modification Example 4

In Embodiment 1, as the external charging method, descriptions are given regarding an example of employing "contact charging method" in which electricity is supplied from the charging station 40 to the vehicle 10 in a state where the charging station 40 and the vehicle 10 are connected to each other. However, as the external charging method, "non-contact charging method" in which electricity is supplied from the charging station 40 to the vehicle 10 in a non-contact manner may be employed.

Embodiment 2

In Embodiment 1, the charging hurdle is raised (usage condition is strict) by raising the charging fee.

In contrast, in Embodiment 2, the charging hurdle is raised by limiting the area in which the usable electricity supply equipment 41 is installed (hereinafter, will be also simply referred to as "usable area").

Figure 6:
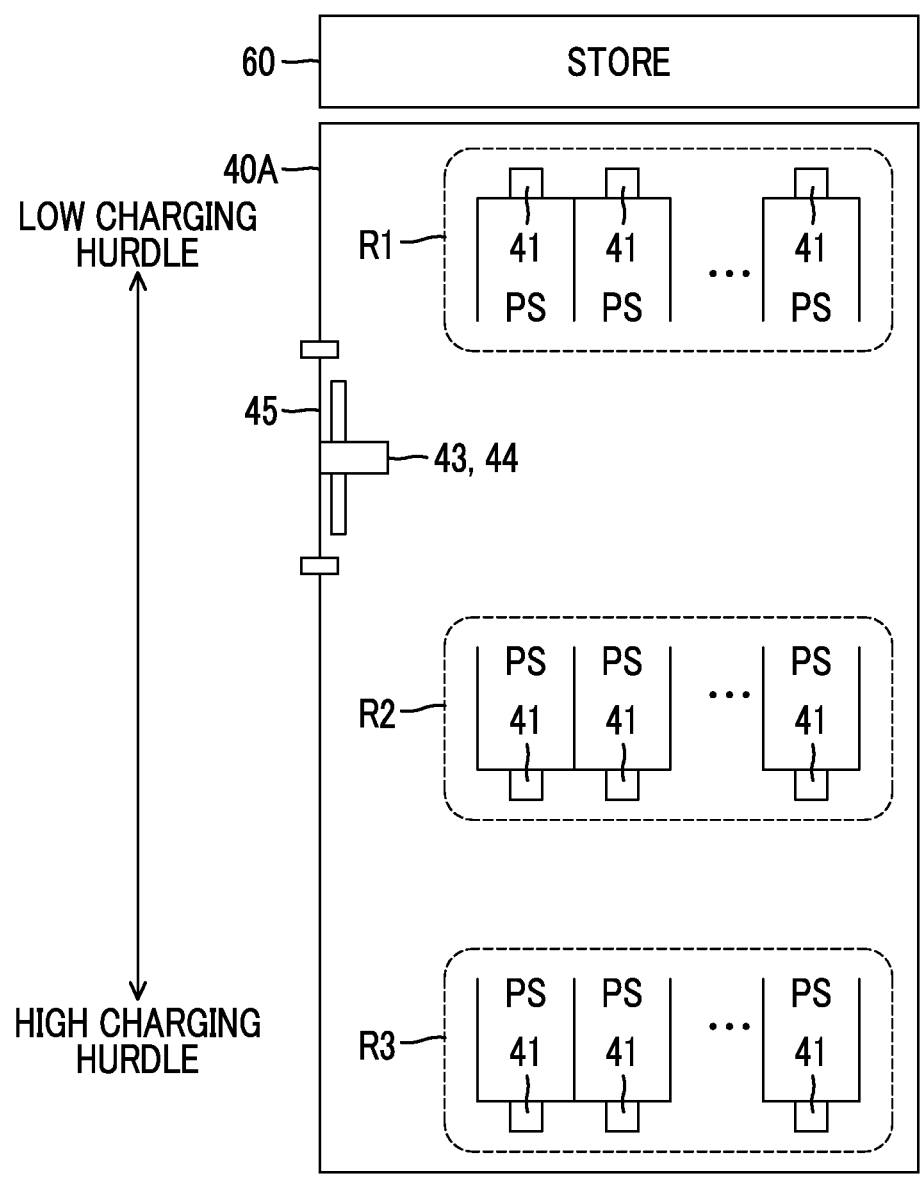
FIG. 6 is a view illustrating an example of disposition of sets of electricity supply equipment in the charging station.

FIG. 6 is a view illustrating an example of disposition of sets of electricity supply equipment 41 in a charging station 40A, according to Embodiment 2. The configurations of the vehicle 10 and the data center 30 other than the charging station 40A are the same as Embodiment 1. Therefore, the detailed descriptions will not be repeated.

As illustrated in FIG. 6, the charging station 40A is provided so as to be adjacent to a store 60, as a parking lot of the store 60. The communication apparatus 43 of the charging station 40 and the control apparatus 44 are disposed in the vicinity of a doorway 45 of the charging station 40A. A plurality of parking spaces PS is provided in the charging station 40A. The parking space PS is disposed by being divided into a first area R1 close to the store 60, a second area R2 away from the store 60 beyond the first area R1, and a third area R3 farther away from the store 60 beyond the second area R2.

One set of the electricity supply equipment 41 is disposed in each of the parking spaces PS. Therefore, the vehicle 10 can be parked in any of the parking spaces PS so as to perform external charging.

In the charging station 40A having the disposition as described above, the control apparatus 44 raise the charging hurdle by limiting the usable area to an area away from the store 60 beyond the first area R1 (second area R2 or third area R3).

Figure 7:
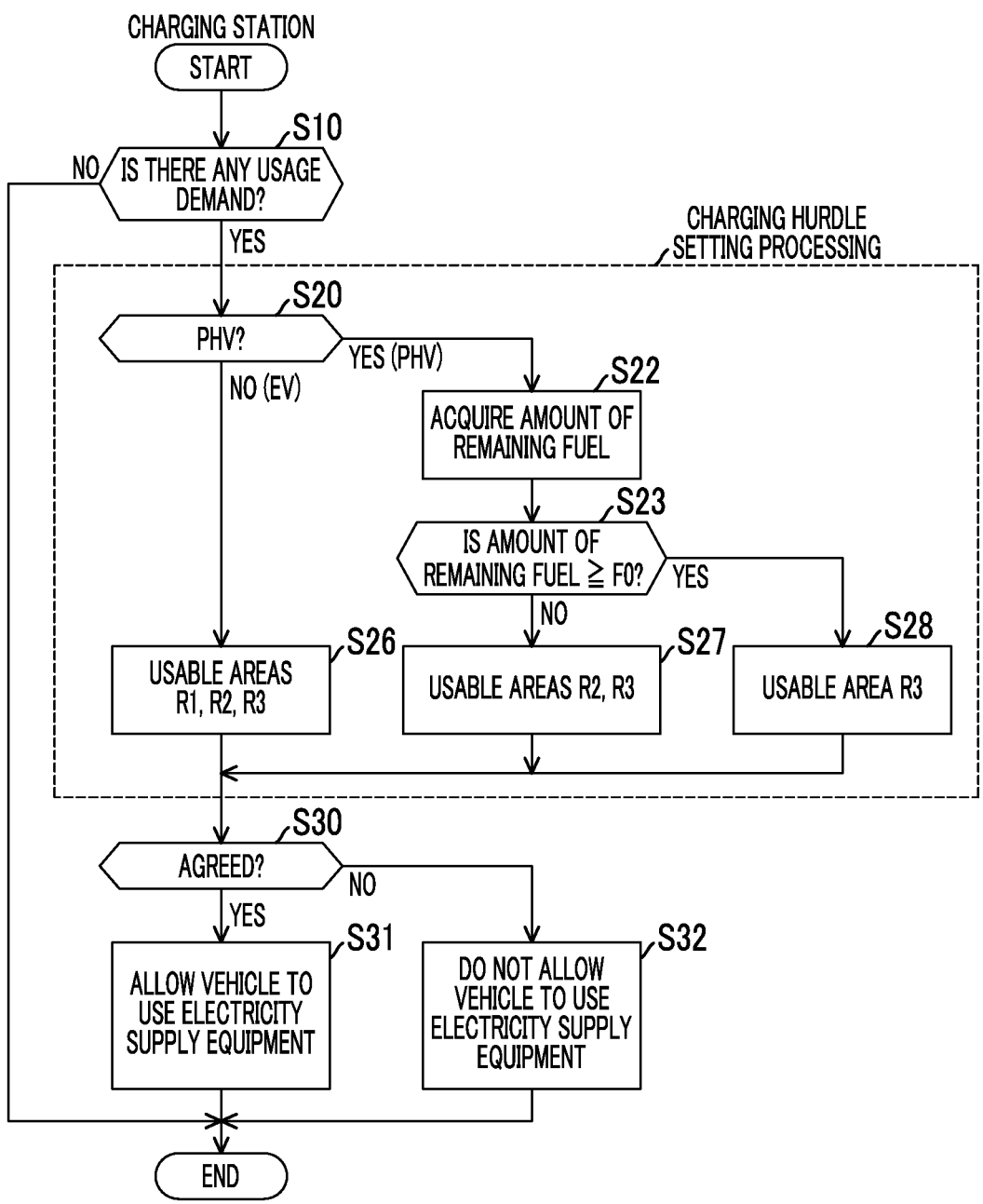
FIG. 7 is a flowchart illustrating a different example (second example) of the processing procedure of the control apparatus.

FIG. 7 is a flowchart illustrating a different example of the procedure of the charging hurdle setting processing performed by the control apparatus 44 of the charging station 40A, according to Embodiment 2. In the flowchart illustrated in FIG. 7, Steps S21, S24, S25 in FIG. 3 are respectively changed to Steps S26, S27, S28. Since other Steps (steps having the same step numbers as the steps illustrated in FIG. 3) have already been described, the detailed descriptions will not be repeated herein.

When the usage demand vehicle is the EV 11 (NO in S20), the control apparatus 44 sets all of the areas R1 to R3 as the usable areas (S26).

When the usage demand vehicle is the PHV 12 (YES in S20), and the amount of remaining fuel is less than the threshold F0 (NO in S23), the control apparatus 44 sets the second area and the third area as the usable areas (S27). That is, the control apparatus 44 excludes the first area R1 closest to the store 60 in all of the areas R1 to R3, from the usable areas.

When the usage demand vehicle is the PHV 12 (YES in S20), and the amount of remaining fuel is equal to or greater than the threshold F0 (YES in S23), the control apparatus 44 sets the third area as the usable area (S28). That is, the control apparatus 44 excludes the first area R1 closest to the store 60 and the second area R2 second-closest to the store 60 after the first area R1 in all of the areas R1 to R3, from the usable area.

When the usable area is set in the processing from S26 to S28, the control apparatus 44 asks the user of the usage demand vehicle whether or not to agree with using the electricity supply equipment 41 at the set usable area. For example, the control apparatus 44 causes a display (not illustrated) set in the vicinity of the doorway 45 or the HMI device 18 of the usage demand vehicle to display the usable area, and to display a message asking the user whether or not to agree with the usable area. Then, the control apparatus 44 determines whether or not to allow the user to use the electricity supply equipment 41 in accordance with whether or not the user agrees the usable area (S30 to S32).

As described above, in Embodiment 2, the charging hurdle can be raised (usage condition becomes strict) by limiting the usable area.

The subject of executing the processing illustrated in the flowchart in FIG. 7 is not always limited to the control apparatus 44 of the charging station 40A. For example, all or a part of the processing illustrated in the flowchart in FIG. 7 may be executed by the control apparatus 32 of the data center 30.

Embodiment 3

In Embodiment 1, the charging hurdle is raised (usage condition becomes strict) by raising the charging fee.

In contrast, in Embodiment 3, the charging hurdle is raised by limiting (prohibiting) the usage of the DC electricity supply equipment. Since the charging system 1 has the same hardware configuration as that of Embodiment 1, the detailed descriptions will not be repeated herein.

As described above, as the types of the electricity supply equipment 41, there are the AC electricity supply equipment and the DC electricity supply equipment that can more quickly charge the vehicle than the AC electricity supply equipment. Hereinafter, descriptions will be given regarding an example in which the control apparatus 44 of the charging station 40 provided with solely the DC electricity supply equipment (hereinafter, will be also referred to as "DC charging station") limits the usage of the DC electricity supply equipment with respect to the PHV 12 having a large amount of remaining fuel.

Figure 8:
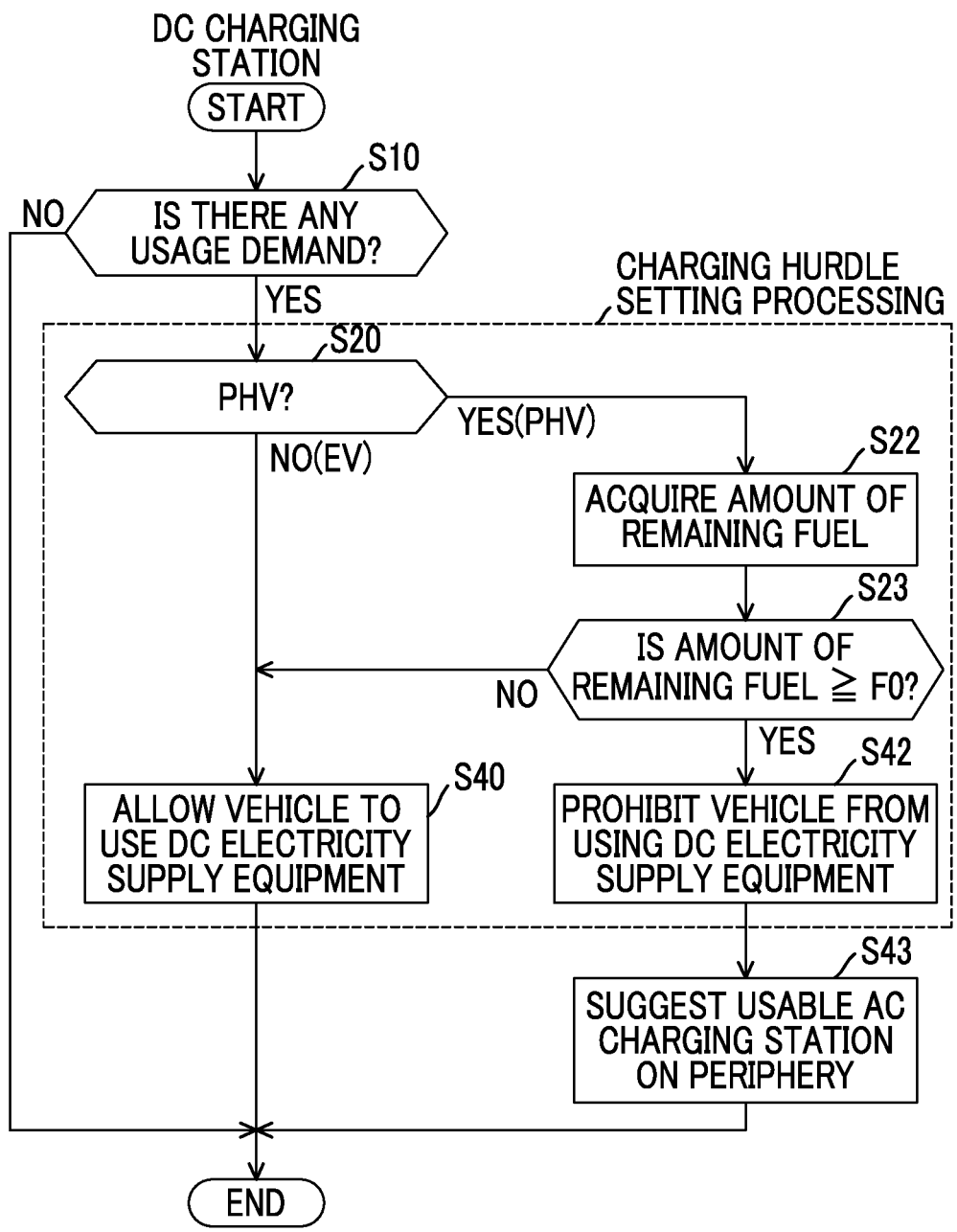
FIG. 8 is a flowchart illustrating a different example (third example) of the processing procedure of the control apparatus.

FIG. 8 is a flowchart illustrating a different example of the procedure of the charging hurdle setting processing performed by the control apparatus 44 of the DC charging station, according to Embodiment 3. In the steps illustrated in FIG. 8, since steps having the same step number as the steps illustrated in FIG. 3 have already been described, the detailed descriptions will not be repeated herein.

When the usage demand vehicle is the EV 11 (NO in S20), or when the usage demand vehicle is the PHV 12 (YES in S20), and the amount of remaining fuel is less than the threshold F0 (NO in S23), the control apparatus 44 allows the usage demand vehicle to use the DC electricity supply equipment (S40).

Meanwhile, when the usage demand vehicle is the PHV 12 (YES in S20), and the amount of remaining fuel is equal to or greater than the threshold F0 (YES in S23), the control apparatus 44 prohibits the DC electricity supply equipment from being used (S42). Specifically, the control apparatus 44 notifies the user of that the DC electricity supply equipment is prohibited from being used. Then, the control apparatus 44 does not execute external charging demanded by the user or does not make a reservation of the charging station 40.

That is, since the PHV 12 having a large amount of remaining fuel can sufficiently travel or generate electricity by using the engine 20, it is possible to mention that the PHV 12 has lower necessity of quick charging than the EV 11 provided with no engine 20 or the PHV 12 having a small amount of remaining fuel. Therefore, the control apparatus 44 according to Embodiment 3 raise the charging hurdle (usage condition is strict) by limiting (prohibiting) the usage of the DC electricity supply equipment with respect to the PHV 12 having a large amount of remaining fuel and having low necessity of quick charging. Accordingly, the EV 11 high necessity of quick charging or the PHV 12 having a small amount of remaining fuel can have precedence and can use the DC electricity supply equipment that can quickly charge the vehicle.

The control apparatus 44 executes the processing of prohibiting the DC electricity supply equipment from being used (S42). Then, the control apparatus 44 obtains positional information of a usable AC charging station (charging station 40 provided with the AC electricity supply equipment) on the periphery, from the data center 30. The control apparatus 44 causes the display (not illustrated) or the like to display positional information and suggest the user of the usage demand vehicle to use the AC charging station (S43). Accordingly, the user prohibited from using the DC electricity supply equipment lessens the trouble of searching for a different charging station 40 that can be used.

The subject of executing the processing illustrated in the flowchart in FIG. 8 is not always limited to the control apparatus 44 of the DC charging station. For example, all or a part of the processing illustrated in the flowchart in FIG. 8 may be executed by the control apparatus 32 of the data center 30.

In addition, the processing in the flowchart in FIG. 8 may be executed by the control apparatus 44 of the charging station 40 provided with both the AC electricity supply equipment and the DC electricity supply equipment. In this case, the control apparatus 44 may ask the user of the PHV 12 having the amount of remaining fuel equal to or greater than the threshold F0, which one of the AC electricity supply equipment and the DC electricity supply equipment the user demands to use. When the user demands to use the AC electricity supply equipment, the control apparatus 44 may allow the user to use the AC electricity supply equipment. When the user demands to use the DC electricity supply equipment, the control apparatus 44 may prohibit the user from using the DC electricity supply equipment.

In addition, the flowchart in FIG. 8 illustrates an example of limiting (prohibiting) the usage of the DC electricity supply equipment with respect to the PHV 12 having a large amount of remaining fuel. However, regardless of the amount of remaining fuel, the usage of the DC electricity supply equipment may be limited (prohibited) with respect to the PHV 12.

Embodiment 4

In Embodiment 1, the charging hurdle is raised (usage condition is strict) by increasing the charging fee.

In contrast, in Embodiment 4, the charging hurdle of the PHV 12 is raised by setting a time zone (hereinafter, will be referred to as "time zone prohibiting PHV from using the electricity supply equipment") in which the data center 30 prohibits the PHV 12 from using the electricity supply equipment. Since the charging system 1 has the same hardware configuration as that of Embodiment 1, the detailed descriptions will not be repeated herein.

Hereinafter, the charging hurdle (time zone prohibiting PHV from using the electricity supply equipment) set by the data center 30 will be described.

Figure 9:
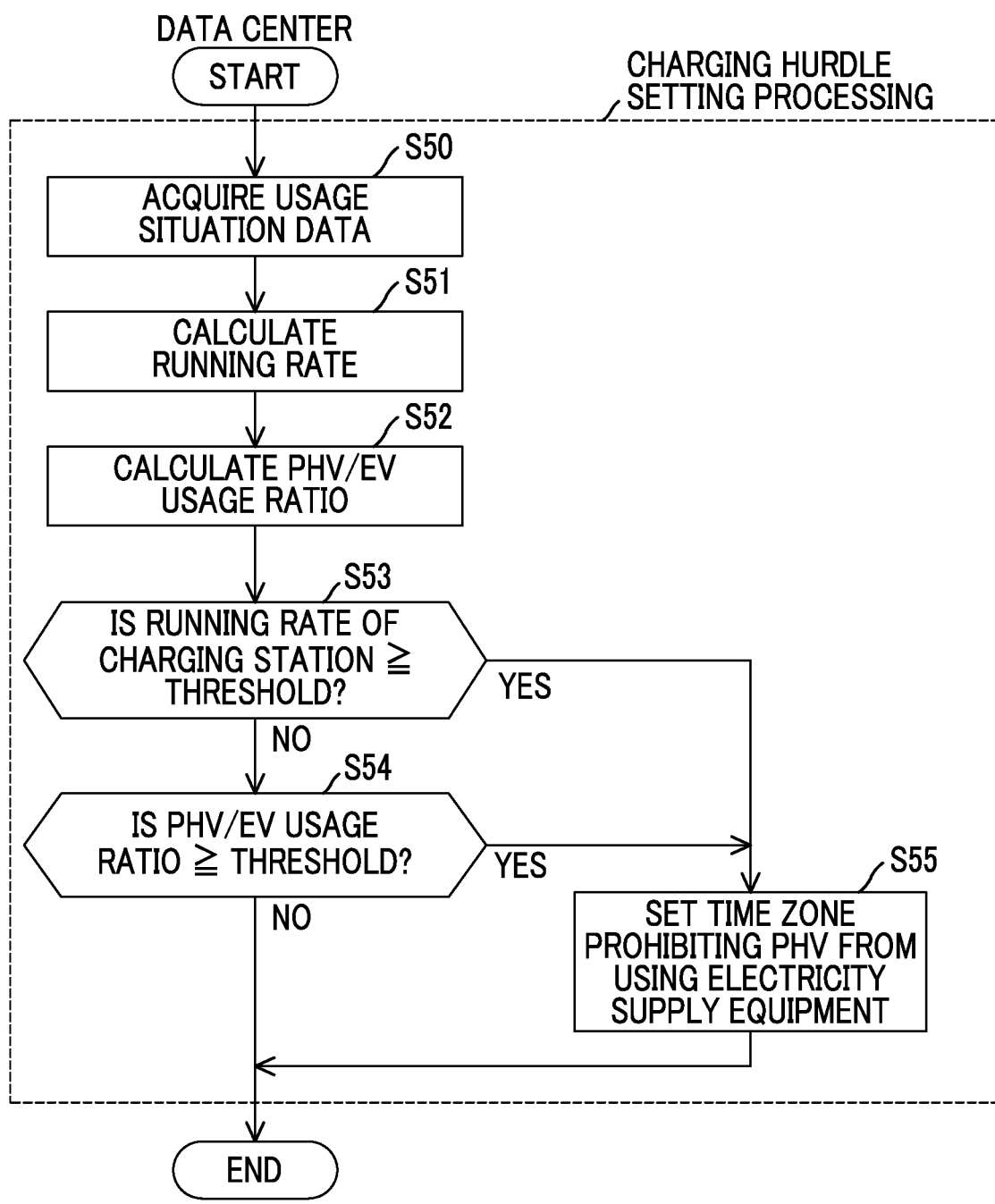
FIG. 9 is a flowchart illustrating a different example (fourth example) of the processing procedure of the control apparatus.

FIG. 9 is a flowchart illustrating a different example of the procedure of the charging hurdle setting processing (processing for setting the time zone prohibiting PHV from using the electricity supply equipment) performed by the control apparatus 32 of the data center 30, according to Embodiment 4.

The control apparatus 32 acquires usage situation data from each of the charging stations 40 in its management area (S50). The usage situation data includes the running situation of each of the charging stations 40 (available running time, actual running time, and the like) and the using situation (the number of available charging stands, the number of the EV 11 in use, the number of the PHV 12 in use, and the like).

The control apparatus 32 uses the usage situation data acquired in S50 and calculates the running rate of all of the charging stations 40 in the management area (for example, the ratio of the sum of the actual running times to the sum of the actual available running times of all of the charging stations 40) (S51). In addition, the control apparatus 32 uses the usage situation data acquired in S50 and calculates the PHV/EV usage rate of all of the charging stations 40 (the ratio of number of the PHV 12 in use to the number of the EV 11 in use) (S52).

The control apparatus 32 determines whether or not the running rate calculated in S51 is equal to or greater than a threshold (S53). In addition, the control apparatus 32 determines whether or not the PHV/EV usage rate calculated in S52 is equal to or greater than the threshold (S54).

When the running rate is less than the threshold (NO in S53), and the PHV/EV usage rate is less than the threshold (NO in S54), the control apparatus 32 skips the processing in S55 and ends the processing.

When the running rate is equal to or greater than the threshold (YES in S53), or when the PHV/EV usage rate is equal to or greater than the threshold (YES in S54), the control apparatus 32 sets the time zone set in advance, as a time zone capable of prohibiting PHV from using the electricity supply equipment, and the control apparatus 32 transmits the set time zone to each of the charging stations 40 in the management area (S55). Accordingly, the time zone prohibiting PHV from using the electricity supply equipment is set in each of the charging stations 40 in the management area.

Figure 10:
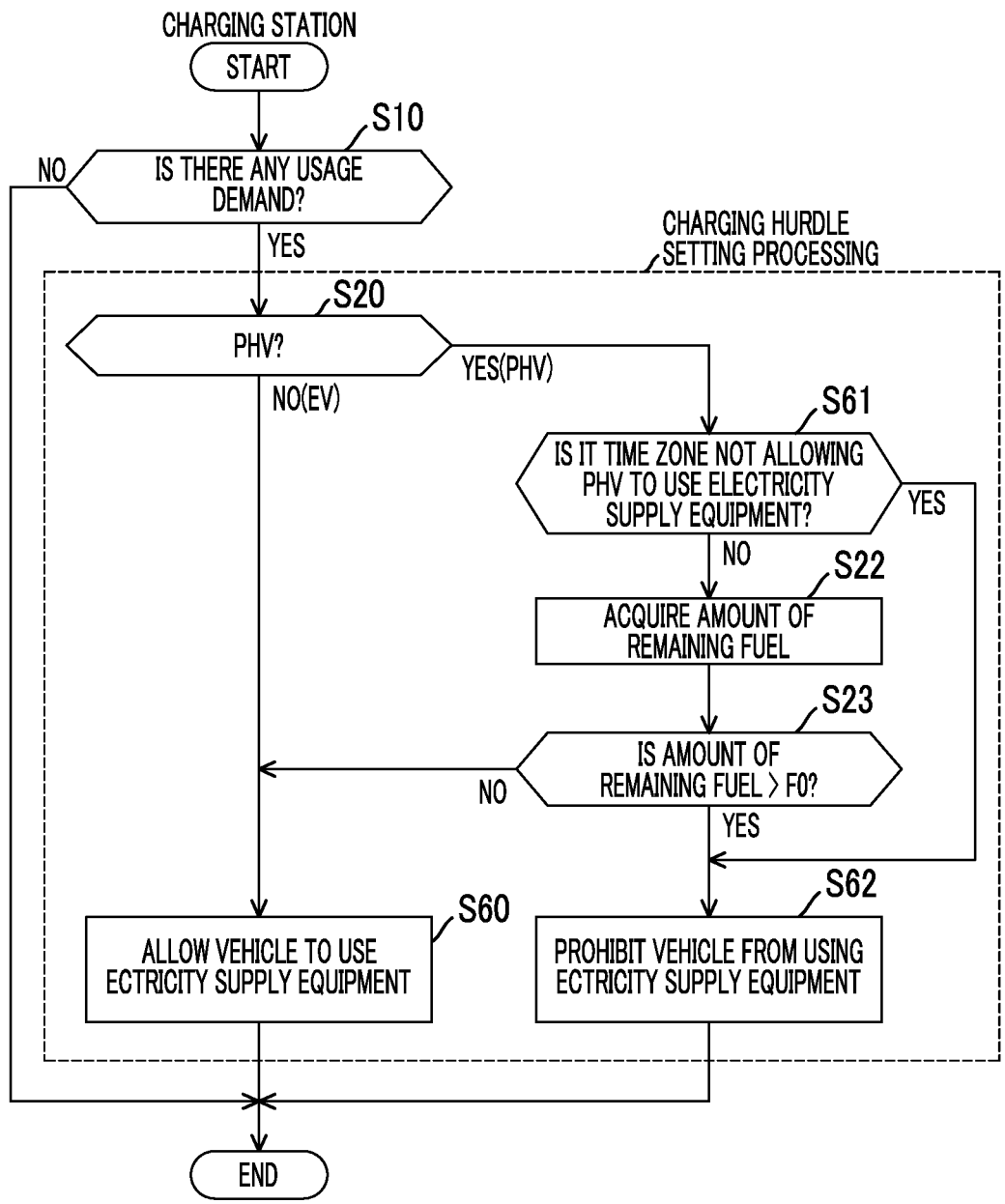
FIG. 10 is a flowchart illustrating a different example (fifth example) of the processing procedure of the control apparatus.

FIG. 10 is a flowchart illustrating a different example of the processing procedure executed by the control apparatus 44 of the charging station 40, according to Embodiment 4. In the steps illustrated in FIG. 10, since steps having the same step number as the steps illustrated in FIG. 3 have already been described, the detailed descriptions will not be repeated herein.

When the usage demand vehicle is the EV 11 (NO in S20), the control apparatus 44 allows the electricity supply equipment 41 to be used (S60).

Meanwhile, when the usage demand vehicle is the PHV 12 (YES in S20), the control apparatus 44 determines whether or not the demanded usage date and time are the time zone capable of prohibiting PHV from using the electricity supply equipment received from the data center 30 (S61). The demanded usage date and time are the current time when the usage (execution of external charging) of the charging station 40 are demanded, and are usage date and time when a reservation of the charging station 40 is demanded.

When the demanded usage date and time are the time zone capable of prohibiting PHV from using the electricity supply equipment (YES in S61), the control apparatus 44 prohibits the electricity supply equipment 41 from being used (S62). Specifically, the control apparatus 44 notifies the user of that the demanded usage date and time are the time zone in which the electricity supply equipment 41 is prohibited from being used. Then, the control apparatus 44 does not execute external charging demanded by the user or does not make a reservation of the charging station 40.

When the current time is the time zone capable of prohibiting PHV from using the electricity supply equipment (NO in S61), the control apparatus 44 determines whether or not the amount of remaining fuel is equal to or greater than the threshold F0 (S22). Then, when the amount of remaining fuel is less than the threshold F0 (NO in S23), the control apparatus 44 allows the electricity supply equipment 41 to be used (S60). When the amount of remaining fuel is equal to or greater than the threshold F0 (YES in S23), the control apparatus 44 prohibits the electricity supply equipment 41 from being used (S62).

As described above, in Embodiment 4, the charging hurdle is raised (usage condition is strict) by setting the time zone prohibiting PHV from using the electricity supply equipment. Therefore, the EV 11 having great urgency in external charging can have precedence and can use the time zone prohibiting PHV from using the electricity supply equipment.

Other Embodiments (1) As the technique of raising the charging hurdle, in place of or in addition to the techniques disclosed in Embodiments 1 to 4, the following technique may be employed.

For example, when both the EV 11 and the PHV 12 demand a reservation on the same usage date and time, the reservation of the EV 11 has precedence (the reservation of the EV 11 is received and the reservation of the PHV 12 is not received), so that the charging hurdle for the PHV 12 can be further raised than the charging hurdle for the EV 11.

In addition, for example, the charging hurdle for the PHV 12 can be further raised than the charging hurdle for the EV 11 by allowing the EV 11 to wait for a cancellation of the reservation, and not allowing the PHV 12 to wait for a cancellation of the reservation.

(2) The charging hurdle may change in accordance with whether or not demand and supply of the electricity are tight in the area where the charging stations 40 are installed.

For example, the data center 30 communicates with electricity company and the like, and determines whether or not a tight electricity demand-supply alert is issued in the management area of the data center 30. When the tight electricity demand-supply alert is not issued, the data center 30 causes the charging hurdle for the PHV 12 and the charging hurdle for the EV 11 to be the same as each other in the management area. Meanwhile, when the tight electricity demand-supply alert is not issued, the data center 30 may prohibit the PHV 12 from using the charging stations 40 in the management area, may allow the EV 11 to use the charging stations 40 in the management area, and may reduce electricity supply in half. Accordingly, the charging hurdle for the PHV 12 can be further raised than the charging hurdle for the EV 11, and the quantity of supplying electricity to the EV 11 can be suppressed.

(3) In Embodiments 1 to 4, the charging hurdle for the PHV 12 (first usage condition) is further raised (strict) than the charging hurdle for the EV 11 (second usage condition). However, on the contrary, when needed, the charging hurdle for the PHV 12 (first usage condition) may be lower (relaxed) than the charging hurdle for the EV 11 (second usage condition).

For example, when the tight electricity demand-supply alert is issued, the charging hurdle for the PHV 12 may be lower than the charging hurdle for the EV 11. Generally, the full charge capacity of the battery 15 for driving mounted in the PHV 12 is smaller than the full charge capacity of the battery 15 for driving mounted in the EV 11. Therefore, when the battery 15 for driving in the EV 11 is caused to be in a fully charged state, compared to when the battery 15 for driving in the PHV 12 is caused to be in a fully charged state, it is postulated that more electricity is used. Therefore, in a situation where the demand and supply of electricity is tight, the charging hurdle of the PHV 12 may be lower than the charging hurdle of the EV 11. Accordingly, the EV 11 using more electricity is restrained from using the charging stations 40, and the quantity of supplying electricity to the vehicle can be restrained in a situation where the demand and supply of electricity is tight.

In addition, for example, the charging hurdle of the PHV 12 in which fuel is not supplied for a predetermined time period (for example, approximately one year) or longer and the amount of remaining fuel is less than the threshold F0 may be lower than the charging hurdle of the EV 11. In the PHV 12, until the electricity storing amount of the battery 15 for driving becomes less than the predetermined value, the EV travelling is basically performed, and the HV travelling is not performed. Therefore, in the PHV 12, when external charging is performed before the electricity storing amount of the battery 15 for driving becomes less than the predetermined value, the fuel of the engine 20 is not consumed. When such a state continues for a predetermined time period (for example, approximately one year) or longer, there is a possibility that the fuel degraded over time will remain in the fuel tank 21. Therefore, for example, the charging fee of the PHV 12 in which the fuel is not supplied for a predetermined time period or longer and the amount of remaining fuel is less than the threshold F0 may be lower than the charging fee of the EV 11. In this manner, the user of the PHV 12 in which the fuel is not supplied for a predetermined time period lowers the amount of remaining fuel less than the threshold F0 (after the fuel is completely used), and then, the user of the PHV 12 performs external charging. Thus, external charging can be performed at a charging fee lower than that of the EV 11. Accordingly, incentive for the consumption of the fuel can be applied to the user of the PHV 12 in which the fuel is not supplied for a predetermined time period or longer. Therefore, the fuel degraded over time can be restrained from remaining in the fuel tank 21 of the PHV 12.

The embodiments and the modification examples can be suitably combined together within a range having no technical contradiction.

The disclosed embodiments are examples in all regards and are not limited. The scope of the disclosure becomes clear by the aspects of the disclosure, not by the descriptions above. It is intended that the disclosure includes the meaning equal to the aspects of the disclosure and all of the changes within the scope.

What is claimed is:

1. A charging system for electrically driven vehicles, the charging system comprising:
    a communication apparatus configured to be able to communicate with an electrically driven vehicle in which an in-vehicle electricity storage device is able to be charged with electricity supplied from electricity supply equipment outside the vehicle; and
    a control apparatus configured to use information received by the communication apparatus from the electrically driven vehicle and to set a usage condition for the electrically driven vehicle to use the electricity supply equipment,
    wherein the control apparatus sets a first usage condition for the electrically driven vehicle when the electrically driven vehicle using the electricity supply equipment is provided with an internal combustion engine,
    wherein the control apparatus sets a second usage condition for the electrically driven vehicle different from the first usage condition when the electrically driven vehicle using the electricity supply equipment is provided with no internal combustion engine, and
    wherein a unit price for charging electricity to be supplied from the electricity supply equipment under the first usage condition is set to be higher than a unit price for charging electricity under the second usage condition.

2. The charging system according to claim 1,
    wherein the first usage condition includes a first sub usage condition and a second sub usage condition different from the first sub usage condition,
    wherein the control apparatus sets the first sub usage condition when an amount of remaining fuel in the internal combustion engine of the electrically driven vehicle is equal to or greater than a threshold, and
    wherein the control apparatus sets the second sub usage condition when an amount of remaining fuel in the internal combustion engine of the electrically driven vehicle is less than the threshold.

3. The charging system according to claim 2, wherein a unit price for charging electricity to be supplied from the electricity supply equipment under the first sub usage condition is set to be higher than a unit price for charging electricity under the second sub usage condition.

4. The charging system according to claim 1, wherein the first usage condition has a limited area in which the electricity supply equipment is used, compared to the second usage condition.

5. The charging system according to claim 1,
    wherein the electricity supply equipment includes first electricity supply equipment and second electricity supply equipment supplying more electricity than the first electricity supply equipment, and
    wherein the first usage condition includes a condition of prohibiting the second electricity supply equipment from being used.

6. The charging system according to claim 1, wherein the first usage condition has a limited time zone in which the electricity supply equipment is used, compared to the second usage condition.

* * * * *

UNITED STATES PATENT AND TRADEMARK OFFICE
CERTIFICATE OF CORRECTION

PATENT NO. : 10,800,274 B2
APPLICATION NO. : 15/723466
DATED : October 13, 2020
INVENTOR(S) : Tomoya Katanoda Page 1 of 1

It is certified that error appears in the above-identified patent and that said Letters Patent is hereby corrected as shown below:

On the Title Page

Item (72), inventor, city, delete "Toyota" and insert --Toyota-shi Aichi-ken--, therefor.

Signed and Sealed this
Twenty-third Day of February, 2021

Drew Hirshfeld
*Performing the Functions and Duties of the
Under Secretary of Commerce for Intellectual Property and
Director of the United States Patent and Trademark Office*